US006497440B2

(12) United States Patent
Kim (10) Patent No.: US 6,497,440 B2
(45) Date of Patent: Dec. 24, 2002

(54) GRIPPER FOR PARTS HAVING DIFFERENT SHAPE IN SURFACE MOUNT DEVICE

(75) Inventor: Dong June Kim, Kyungki-do (KR)

(73) Assignee: Mirae Corporation, Chunan-shi (KR)

( * ) Notice: Subject to any disclaimer, the term of this patent is extended or adjusted under 35 U.S.C. 154(b) by 0 days.

(21) Appl. No.: 10/000,342

(22) Filed: Dec. 4, 2001

(65) Prior Publication Data

US 2002/0070571 A1 Jun. 13, 2002

(30) Foreign Application Priority Data

Dec. 13, 2000 (KR) .................................. 2000-0076147

(51) Int. Cl.[7] .............................................. B25J 15/08
(52) U.S. Cl. ........................ 294/88; 294/119.1; 901/37
(58) Field of Search ............................... 294/88, 103.1, 294/116, 119.1, 902; 901/37, 39

(56) References Cited

U.S. PATENT DOCUMENTS

| 3,204,997 | A | * | 9/1965 | De Vries | 294/119.1 X |
|---|---|---|---|---|---|
| 4,593,948 | A | * | 6/1986 | Borcea et al. | 294/119.1 X |
| 4,607,873 | A | * | 8/1986 | Nusbaumer et al. | 294/119.1 X |
| 4,680,523 | A | * | 7/1987 | Goumas et al. | 294/119.1 X |
| 5,125,708 | A | * | 6/1992 | Borcea et al. | 294/119.1 X |
| 5,190,334 | A | * | 3/1993 | Sawdon | 294/119.1 X |
| 5,762,391 | A | * | 6/1998 | Sumnitsch | 294/119.1 |
| 5,967,581 | A | * | 10/1999 | Bertini | 294/119.1 X |
| 6,012,222 | A | | 1/2000 | Asai et al. | 29/842 |
| 6,334,641 | B1 | * | 1/2002 | Oh | 294/119.1 |

FOREIGN PATENT DOCUMENTS

| DE | 2263618 | * | 7/1974 | 294/119.1 |
|---|---|---|---|---|
| DE | 3322142 | * | 12/1984 | 294/119.1 |
| DE | 4320071 | * | 1/1994 | 294/119.1 |

* cited by examiner

Primary Examiner—Johnny D. Cherry
(74) Attorney, Agent, or Firm—Fleshner & Kim, LLP (57) ABSTRACT

A gripper for parts having different shapes is disclosed. The gripper includes a holder having one end mounted and moved in a socket unit, and having a penetration groove forming a passage of air flown through the socket unit; a piston mounted in the penetration groove, and lifted or lowered due to a pressure of the air flown through the penetration groove; a movement unit having a slanted surface to be horizontally moved in a direction of increasing or decreasing an interval by the piston lifted or lowered; and grip tips for picking up or putting the parts. The grip tips are moved to pick up the parts having the different shape and easily mount the parts on the PCB.

18 Claims, 8 Drawing Sheets

FIG. 1

PRIOR ART

GRIPPER FOR PARTS HAVING DIFFERENT SHAPE IN SURFACE MOUNT DEVICE

BACKGROUND OF THE INVENTION

1. Field of the Invention

The present invention relates to a gripper for parts having a different shape in a surface mount device, and in particular to an improved gripper for parts having a different shape which can easily pick up the parts, transfer the parts to a printed circuit board, and mount the parts on the printed circuit board when a surface mount device mounts the parts on the printed circuit board.

2. Description of the Background Art

Figure 1:
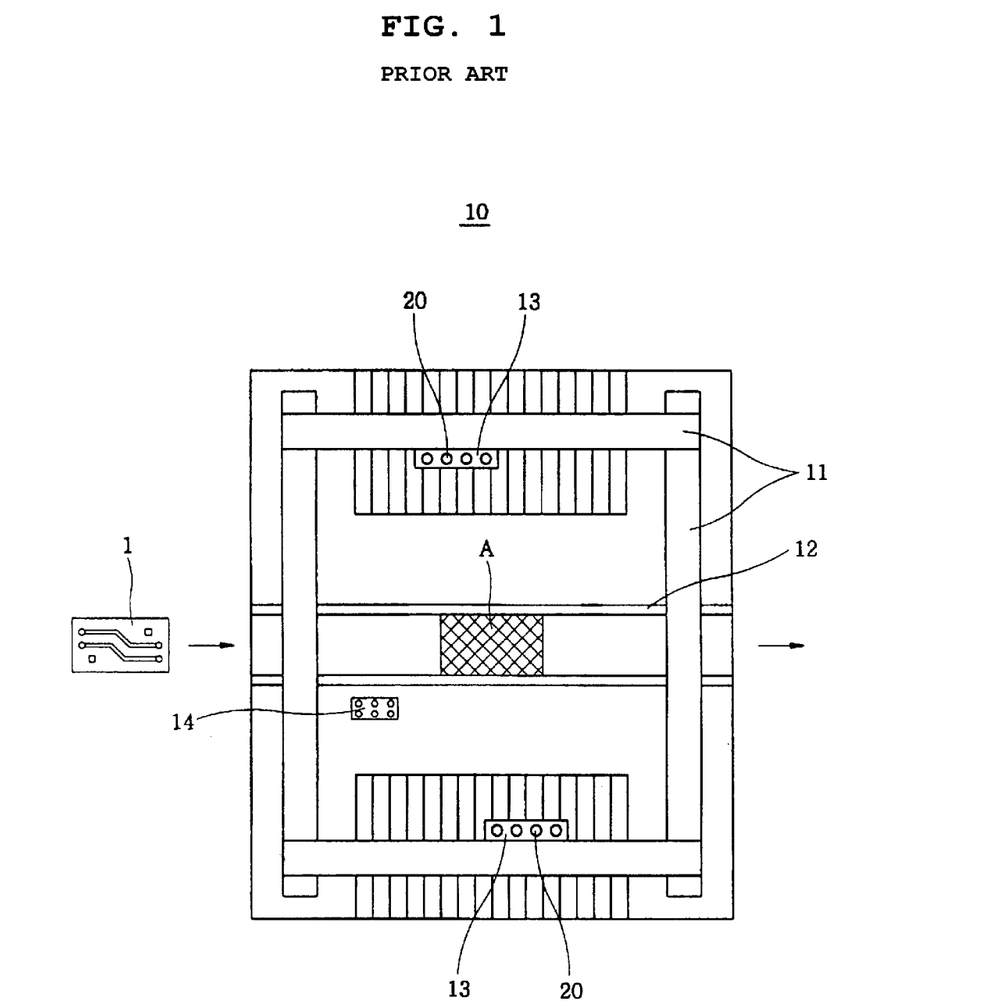
FIG. 1 is a plan view illustrating a surface mount device.

A surface mount device is used to rapidly precisely mount a plurality of parts on a printed circuit board. A structure of the surface mount device for rapidly precisely mounting parts on the printed circuit board will now be explained with reference to the accompanying drawings. FIG. 1 is a plan view illustrating the surface mount device. As shown therein, the surface mount device 10 includes an X-Y gantry 11, a printed circuit board conveyor 12, a module head 13 and a nozzle exchanger 14.

The X-Y gantry 11 transfers the module head 13 in an X-Y axis direction. The module head 13 transferred by the X-Y gantry 11 in the X-Y axis direction transfers parts to a printed circuit board 1. The printed circuit board 1 is transferred to a mounting operation position A by the printed circuit board conveyor 12. When the printed circuit board 1 is transferred to the mounting operation position A by the printed circuit board conveyor 12, the module head 13 sucks the parts, transfers the parts to the printed circuit board 1, and mounts the parts on the printed circuit board 1.

Figure 2:
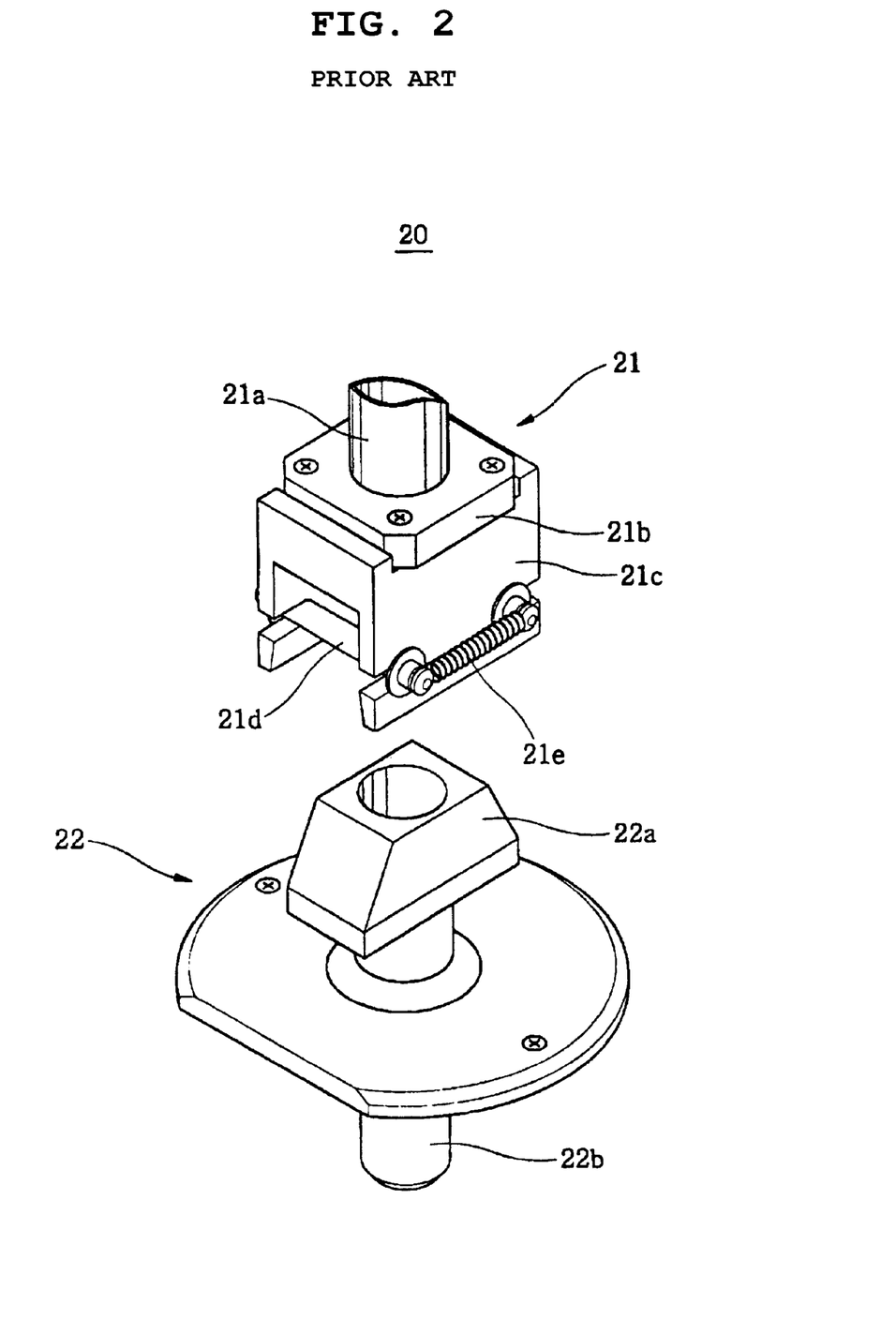
FIG. 2 is a perspective view illustrating a conventional nozzle apparatus in FIG. 1.

The module head 13 sucking the parts and transferring the sucked parts to the printed circuit board 1 includes a plurality of nozzle apparatuses 20. A structure of the nozzle apparatus 20 will now be explained with reference to FIG. 2. Referring to FIG. 2, the nozzle apparatus 20 includes a socket unit 21 and a holder unit 22. The socket unit 21 includes a hollow shaft 21a, an assembly block 21b, a connection block 21c, a socket shaft 21d and an elastic member 21e. The holder unit 22 includes a holder 22a and a holder shaft 22b.

The hollow shaft 21a of the socket unit 21 has a hollow, and the connection block 21c is installed by the assembly block 21b formed on the bottom surface of the hollow shaft 21a. The holder 22a of the holder unit 22 is moved to the inner portion of the connection block 21c moved by the assembly block 21b. The socket shaft 21d and the elastic member 21e are disposed on the bottom surface of the connection block 21c in order to firmly and removably support the holder 22a moved to the inner portion of the connection block 21c.

The socket shaft 21d of the connection block 21c is supported at both side portions of the connection block 21c by the elastic member 21e. The socket shaft 21d supported by the elastic member 21e and moved to a slanted surface of the connection block 21c supports both side portions of the holder 22a of the holder unit 22 in movement. The holder shaft 22b is formed on the bottom surface of the holder 22a having its side portions supported by the socket shaft 21d.

When the holder 22a is moved to the inner portion of the connection block 21c, a nozzle (not shown) is mounted on the holder shaft 22b. In this state, a component is adsorbed by the nozzle, transferred to the printed circuit board 1, and mounted thereon. To replace the holder unit 22, the socket unit 21 is moved to the nozzle exchanger (14 in FIG. 1), and rapidly moved in a vertical direction to pick up the holder unit 22 disposed at the nozzle exchanger 14, thereby mounting and replacing the holder unit 22. The nozzle (not shown) is mounted at the inner portion of the holder shaft 22b of the replaced holder unit 22.

The nozzle in the conventional art is formed to pick up surface mounting parts having a constant shape and size and to mount the parts on the printed circuit board, and thus it is difficult to grip parts having a different shape and size.

SUMMARY OF THE INVENTION

Accordingly, it is a primary object of the present invention to provide a gripper for parts having a different shape which can pick up parts having a variable shape and size in a surface mount device, and mount the parts on a printed circuit board.

Another object of the present invention is to easily pick up parts having a different shape by providing a gripper for the parts, and easily mount the parts on a printed circuit board.

In order to achieve the above-described objects of the invention, there is provided a gripper for parts having a different shape comprising: a holder having one end mounted and moved in a socket unit, and having a penetration groove forming a passage of air flown through the socket unit; a piston mounted in the penetration groove, and lifted or lowered due to a pressure of the air flown through the penetration groove; a movement unit being installed at both side ends of the other end of the holder, and having a slanted surface to be horizontally moved in a direction of increasing or decreasing an interval by the piston lifted or lowered due to the air flown through the penetration groove; and a plurality of grip tips fixed to the movement unit, and engaged with the horizontal movement of the movement unit, for picking up or putting the parts.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A gripper for a component having a different shape in a surface mount device in accordance with a preferred embodiment of the present invention will now be described in detail with reference to the accompanying drawings.

Figure 3:
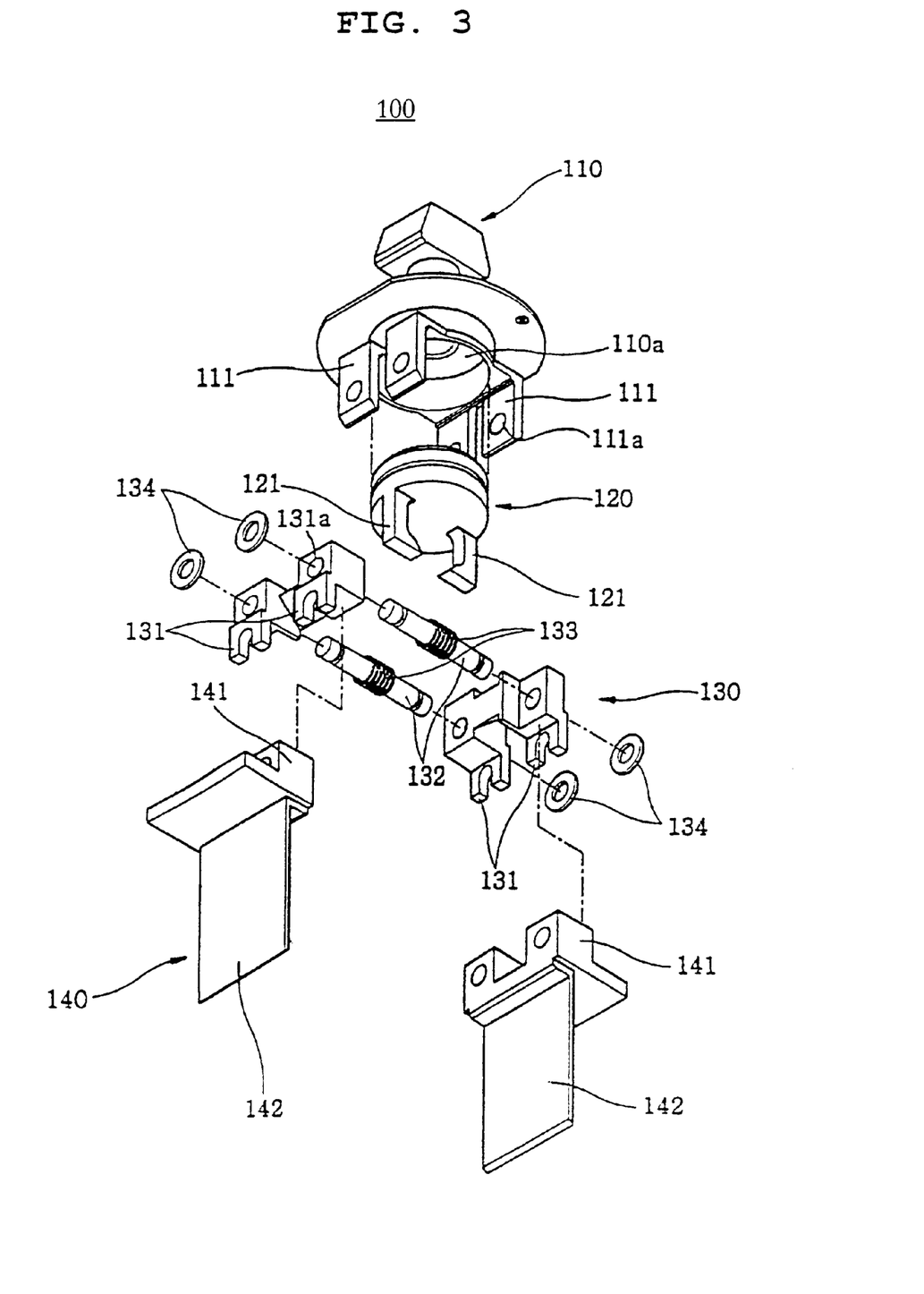
FIG. 3 is an exploded perspective view illustrating a gripper for parts having a different shape in accordance with the present invention.
Figure 4:
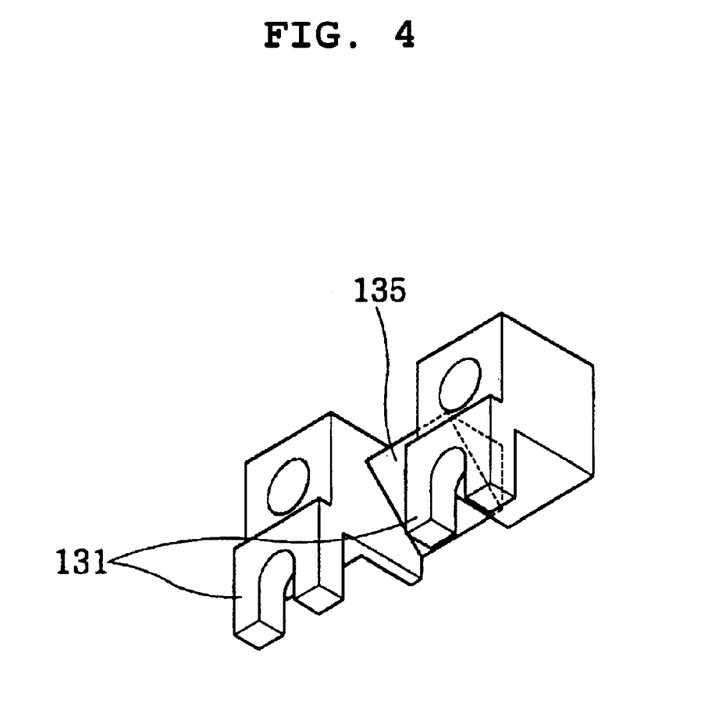
FIG. 4 is an enlarged perspective view illustrating a movement unit in FIG. 3.
Figure 5:
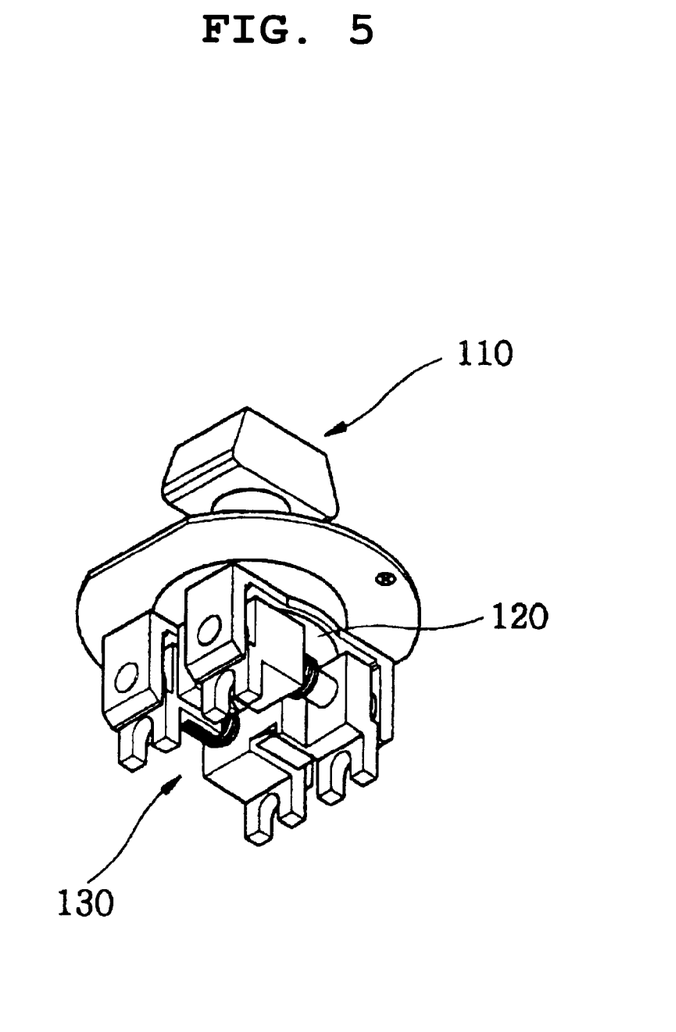
FIG. 5 is a perspective view illustrating an assembly state of the gripper in FIG. 3.
Figure 6:
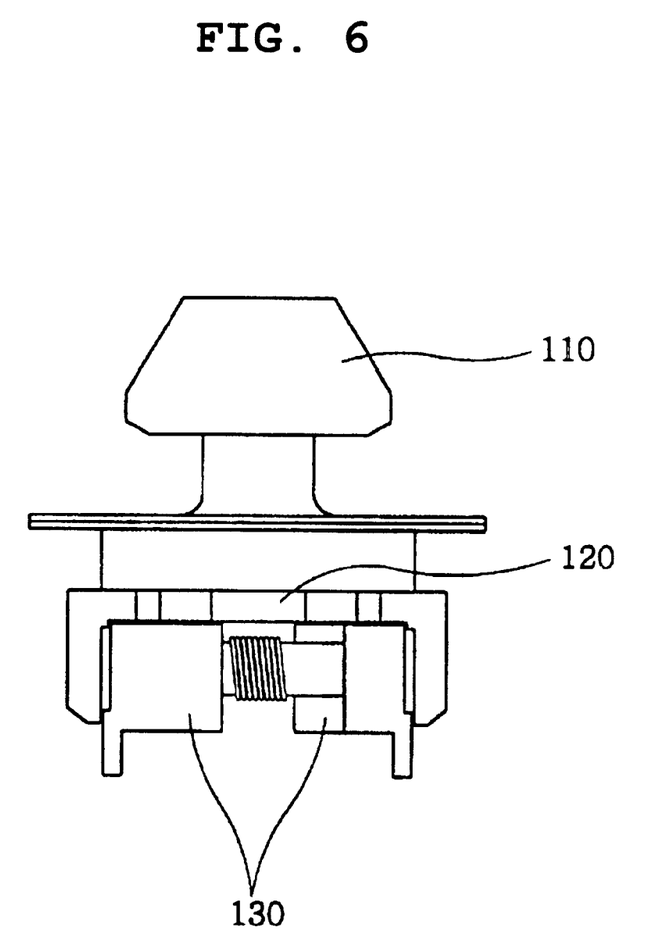
FIG. 6 is a side view illustrating the gripper in FIG. 5.
Figure 7:
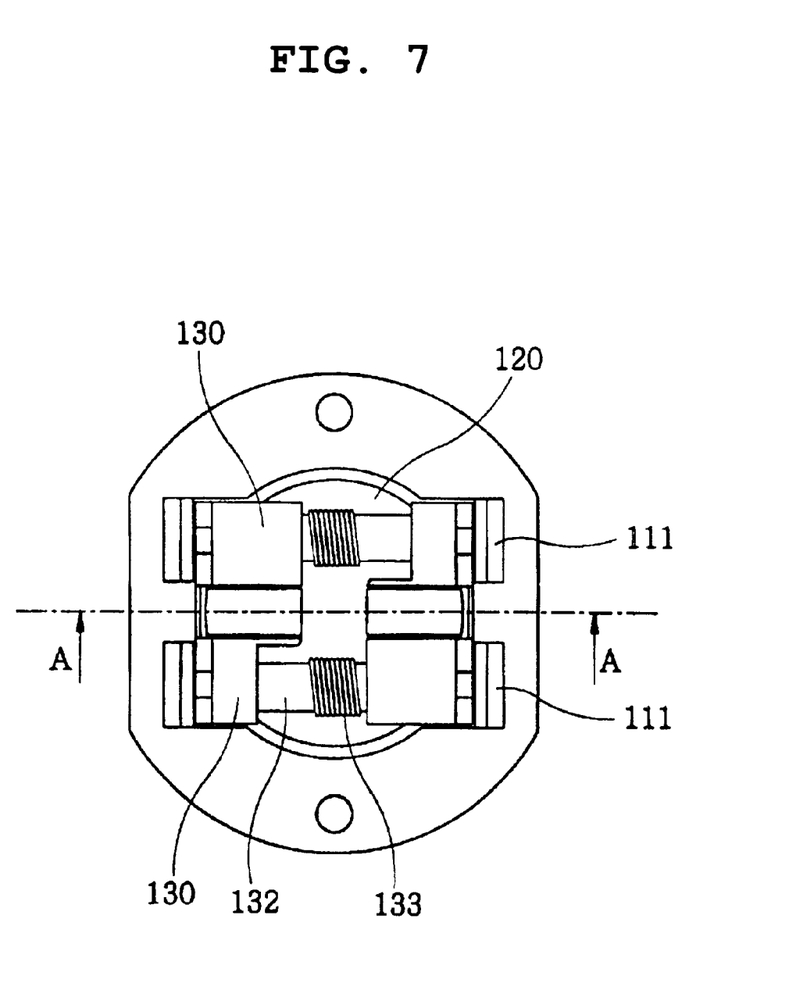
FIG. 7 is a bottom view illustrating the gripper in FIG. 6.

FIG. 3 is an exploded perspective view illustrating the gripper in accordance with the present invention, FIG. 4 is an enlarged perspective view illustrating a movement unit in FIG. 3, and FIG. 5 is a perspective view illustrating an assembly state of the gripper in FIG. 3. Referring to FIGS. 3 to 5, the gripper for the parts having the different shape includes: a holder 110 having one end mounted and moved in the socket unit (21 in FIG. 2), and having a penetration groove 110a forming a passage of air flown through the socket unit 21; a piston 120 moved in the penetration groove 110a, and lifted or lowered due to a pressure of the air flown through the penetration groove 110a; a movement unit 130 being installed at both side ends of the other end of the holder 110, and having a slanted surface to be horizontally moved in a direction of increasing or decreasing an interval by the piston 120 lifted or lowered due to the air flown through the penetration groove 110a; and a plurality of grip tips 140 fixed to the movement unit 130, and engaged with the horizontal movement of the movement unit 130, for picking up or putting the parts (not shown).

The structure and operation of the present invention will now be explained in more detail.

The gripper 100 for the parts having the different shape in the surface mount device includes: the holder 110, the piston 120, the movement unit 130 and the plurality of grip tips 140. As illustrated in FIGS. 3 to 7, the gripper 100 is moved to lift or lower the piston 120 in a vertical direction at the inner portion of the holder 110. The movement unit 130 is fixed to the holder 110 to be moved in a horizontal direction due to the lifting or lower operation of the piston 120. The plurality of grip tips 140 engaged with the movement unit 130 for picking up or putting the parts (not shown) having the different shape are fixed to the bottom surface of the movement unit 130.

Figure 8:
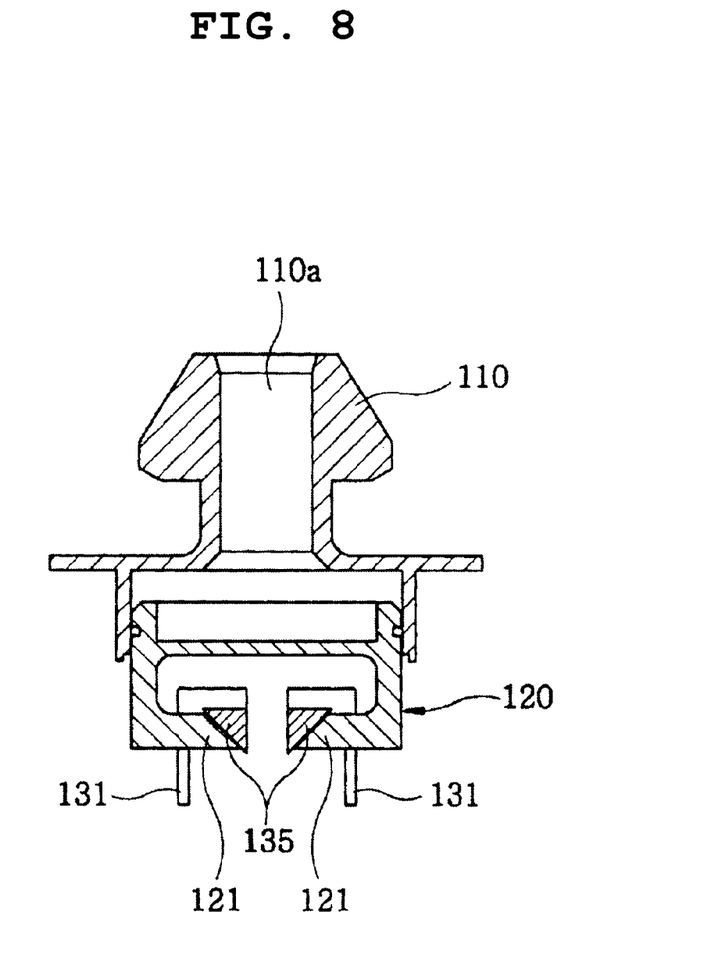
FIG. 8 is a cross-sectional view illustrating the gripper in FIG. 7, taken along lines A–A'.

The air is used as a driving force for moving the grip tips 140 installed on the bottom surface of the movement unit 130 in a direction of being adjacent to or far from each other. The air is supplied to the holder 110 through the socket unit (21 in FIG. 2). As shown in FIG. 8, the holder 110 has its one end positioned in the socket unit 21. The penetration groove 110a having a predetermined diameter is formed therein to lift or lower the piston 120 by the air flown through the socket unit 21.

At the other end of the holder 110 having the penetration groove 110a, fixing members 111 having recess holes 111a face each other separately from each other by a predetermined distance to install the movement unit 130. The piston 120 installed in the penetration groove 110a of the holder 110 is lifted or lowered in a vertical direction due to a pressure of the air flown through the penetration groove 110a. A slanted member 121 is formed on the bottom surface of the piston 120 lifted or lowered in the penetration groove 110a. A slanted surface 135 of the movement unit 130 is provided to contact the slanted member 121.

The slanted surface 135 of the movement unit 130 is formed to contact the slanted member 121 of the piston 120, and slid along the slanted member 121 due to the lifting or lowering movement of the piston 120, thereby moving the movement unit 130 in the direction of increasing or decreasing the interval. That is, when the air is inputted to the penetration groove 110a, the piston 120 is lowered. The slanted member 121 formed on the bottom surface of the piston 120 is lowered due to the lowering operation of the piston 120, and the movement unit 130 decreases the interval due to the lowering operation of the slanted member 121.

Conversely, when the pressure of the air flown through the penetration groove 110a is intercepted, the movement unit 130 increases the interval due to the spring 133, and the piston 120 is lifted by the spring 133. Here, the spring 133 is installed in a guide shaft 132 of the movement unit 130, compressed in the lowering operation of the piston 120, and released in the lifting operation of the piston 120. The movement unit 130 horizontally moved in the direction of increasing or decreasing the interval due to the lifting or lowering operation of the piston 120 includes moving blocks 131 having one or more penetration holes 131a at predetermined positions, a plurality of guide shafts 132 and a plurality of elastic members 133.

The moving blocks 131 of the movement unit 130 are mounted in the fixing members 111 formed at both side portions of the other end of the holder 110. The plurality of guide shafts 132 are installed between the moving blocks 131. Here, in the state that the elastic members 133 are provided to the outer surfaces of the guide shafts 132, an end of the guide shaft 132 is mounted to the recess hole 111a of the fixing member 111 through the penetration hole 131a of the moving block 131. As a result, the plurality of guide shafts 132 are installed between the moving blocks 131. A groove is formed along the circumference in both ends of the guide shaft 132. The plurality of guide shafts 132 installed between the moving blocks 131 are positioned between the moving blocks 131 and the fixing members 111 by snap rings 134.

The plurality of guide shafts 132 mounted between the moving blocks 131 and the fixing members 111 guide the moving blocks 131 in the horizontal movement. When the moving blocks 131 are horizontally moved in a direction of decreasing the interval, and then moved in a direction of increasing the interval, the elastic members 133 installed on the outer surfaces of the guide shafts 132 return the moving blocks 131 to the original position by the elastic force.

The plurality of grip tips 140 are fixed to the moving blocks 131 horizontally moved in the direction of increasing or decreasing the interval. Adhesive materials, a screw, or a bolt, etc. can be used as a fixing means. The grip tips 140 fixed to the moving blocks 131 are installed by connecting the assembly blocks 141 to the moving blocks 131. The assembly block 141 picks up or puts the parts by using tips 142 formed on the upper end portion thereof. The plurality of grip tips 140 having the tips 142 pick up or put the parts, and mount the parts on the printed circuit board by engaging the tips 142 with the horizontal movement of the moving blocks 131.

In accordance with the present invention, in the surface mount device, the grip tips are moved in a horizontal direction to pick up the parts having the different shape and mount the parts on the printed circuit board, thereby easily mounting the parts on the printed circuit board.

As discussed earlier, in the surface mount device, the grip tips are moved in a horizontal direction to pick up the parts having the different shape and mount the parts on the printed circuit board, thereby easily mounting the parts on the printed circuit board.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A gripper to grip parts, comprising:
   a plurality of fixing members, wherein each fixing member comprises a recess hole;
   at least one guide shaft, wherein each guide shaft comprises two ends and each end is configured to be inserted into a corresponding recess hole such that each guide shaft is supported by at least two fixing members;
   a plurality of moving blocks, wherein each moving block comprises a following slanted surface and wherein each moving block is configured to be slidably supported by a guide shaft;
   at least one elastic member, wherein each elastic member is configured to urge at least one moving block towards an end of a guide shaft;
   a plurality of grip tips, wherein each grip tip is configured to be attached to a moving block; and
   a driving member having at least one driving slanted surface that is configured to slidably engage the following slanted-surface of a corresponding moving block such that the moving block is urged away from an end of a guide shaft when the driving member moves in a first direction, and wherein the moving block is urged towards the end of a guide shaft by the elastic member when the driving member moves in a second direction.

2. The gripper of claim 1, wherein the driving member comprises a pneumatic piston.

3. The gripper of claim 1, wherein each elastic member comprises a coil spring wound around a guide shaft.

4. The gripper of claim 1, wherein each elastic member is configured to urge at least two moving blocks in opposite directions along each guide shaft.

5. The gripper of claim 1, wherein each grip tip comprises an assembly block configured to be removably attached to a respective moving block.

6. The gripper of claim 1, wherein the at least one elastic member is configured to move two moving blocks towards opposite ends of a guide shaft until the moving blocks contact the fixing members supporting the ends of the guide shaft.

7. The gripper of claim 6, wherein a position of the fixing members defines a maximum separation distance between the moving blocks.

8. The gripper of claim 1, wherein each guide shaft is configured to be fixed into its respective fixing members with snap rings.

9. The gripper of claim 1, wherein each moving block is configured to be guided by a guide shaft.

10. The gripper of claim 1, wherein each moving block comprises at least two penetration holes configured to allow two corresponding guide shafts to pass therethrough.

11. The gripper of claim 10, wherein the following slanted surface on each moving block is located between two guide shafts that support the moving block.

12. A gripper to grip parts, comprising:
    a plurality of fixing members, wherein each fixing member comprises a recess hole;
    a plurality of guide shafts, wherein each guide shaft comprises two ends and each end is configured to be inserted into a corresponding recess hole such that each guide shaft is supported by at least two fixing members;
    a plurality of moving blocks, wherein each moving block comprises a following slanted surface and each moving block is configured to be slidably supported by at least two guide shafts with the following slanted surface substantially centered between the at least two guide shafts supporting the moving block;
    a plurality of elastic members, wherein each elastic member is configured to urge at least one moving block towards ends of the guide shafts supporting the moving block;
    a plurality of grip tips, wherein each grip tip is configured to be attached to a moving block; and
    a driving member comprising at least two driving slanted surfaces, wherein each driving slanted surface is configured to slidably engage a following slanted surface of one of the moving blocks such that the moving block is urged away from ends of the at least two guide shafts supporting the moving block when the driving member moves in a first direction, and wherein the moving block is urged towards the ends of the at least two guide shafts supporting the moving block by the elastic member when the driving member moves in a second direction.

13. The gripper of claim 12, wherein the driving member comprises a pneumatic piston.

14. The gripper of claim 12, wherein each elastic member comprises a coil spring wound around a corresponding guide shaft.

15. The gripper of claim 12, wherein each grip tip comprises an assembly block configured to be removably attached to a respective moving block.

16. The gripper of claim 12, wherein each moving block comprises at least two penetration holes, and wherein each penetration hole is configured to allow a guide shaft to pass therethrough.

17. A gripper to grip parts, comprising:
    a plurality of fixing members, wherein each fixing member comprises a recess hole;
    a plurality of guide shafts, wherein each guide shaft comprises two ends and each end is configured to be inserted into a corresponding recess hole such that each guide shaft is supported by at least two fixing members;
    a plurality of grip tips, wherein each grip tip comprises a following slanted surface, wherein each grip tip is configured to be sidably supported by at least two guide shafts, and wherein the following slanted surface is approximately centered between the at least two guide shafts supporting the grip tip;
    a plurality of elastic members, wherein each elastic member is configured to urge at least one grip tip towards ends of the at least two guide shafts supporting the grip tip;
    a driving member having at least two driving slanted surfaces that are configured to slidably engage the following slanted surfaces of two corresponding grip tips such that the grip tips are urged away from ends of the at least two guide shafts when the driving member moves in a first direction, and wherein the grip tips are urged towards the ends of the at least two guide shafts by the elastic members when the driving member moves in a second direction.

18. The gripper of claim 17, wherein each grip tip comprises:
    a tip removably attached to an assembly block; and
    a moving block configured to be removably attached to the assembly block, wherein the moving block is configured to be slidably supported by the at least two guide shafts.

* * * * *